John W. Keller
INVENTOR.

Aug. 22, 1967     J. W. KELLER     3,336,685
GROUND SURFACING APPARATUS
Filed Sept. 28, 1964     2 Sheets—Sheet 2

John W. Keller
INVENTOR.

BY *Eugene O. Farley*

*Atty.*

United States Patent Office 3,336,685
Patented Aug. 22, 1967

3,336,685
GROUND SURFACING APPARATUS
John W. Keller, 10140 Walnut Ave.,
Puyallup, Wash. 98371
Filed Sept. 28, 1964, Ser. No. 399,657
8 Claims. (Cl. 37—175)

ABSTRACT OF THE DISCLOSURE

A frame adapted to be coupled to a tractor supports a ground scraping blade provided with lateral, adjustable extensions; a forward ground leveling drag pivoted for adjustment between an elevated, inoperative position and a lowered, operative position; and a rearward ground leveling drag mounted for removal from the frame.

---

This invention pertains to ground surfacing apparatus of the class employed to scrape, drag, smooth and pack rough, uneven ground.

It is the general purpose of the present invention to provide ground surfacing apparatus which is simple in its construction, relatively inexpensive, yet versatile in its operation in that it may be caused to perform its scraping, dragging, smoothing and packing functions independently or cooperatively, upon making simple, easily effectuated adjustments.

It is another object of the invention to provide ground surfacing apparatus which is adapted for use as an adjunct of a tractor equipped with conventional lift and draw bars.

Still another purpose of the invention is the provision of ground surfacing apparatus which is maneuverable easily in restricted areas, which can reach into corners ordinarily inaccessible, and which does not leave side streaks of dirt after each traverse of the work plot.

Generally stated the apparatus accomplishing the foregoing and other objects of the invention comprises a frame having coupling means for coupling it to a tractor or other vehicle. Three separate operational units are mounted on the frame.

The first of these is a centrally located, transversally arranged scraping blade.

The second is a forward ground-leveling drag mounted in front of the blade and provided with shifting means for shifting it between an elevated, inoperative position and a lowered, operative position, depending upon whether or not the scraper is to be a primary functioning unit of the assembly.

The third is a rearward ground-leveling drag mounted behind the scraper. This is provided with releasable attaching means for attaching it to the frame so that it may be removed when not needed.

In addition, lateral extensions are provided one on each end of the blade. These may be angled forwardly to work the blade into corners which otherwise are inaccessible. Also, when in this position they level off and distribute the side strips of dirt usually left by apparatus of the presently described class.

On the other hand, the extensions may be angled to a neutral position as well as rearwardly, in which latter position they push dirt outwardly into holes, such as seen along the edges of a lawn or field, or along the margin of a building foundation.

Thus, when it is desired to use the apparatus as a combination scraper and drag, the forward drag unit may be elevated to its inoperative position, whereupon the scraper works down the ridges and removes rocks and rough spots, while the rearward drag smooths and packs the scraped surface. Then when it is desired to employ the apparatus primarily as a drag, the forward drag unit may be lowered into operative position whereupon it coacts with the rearward drag unit to perform an efficient ground surfacing operation.

Figure 1:
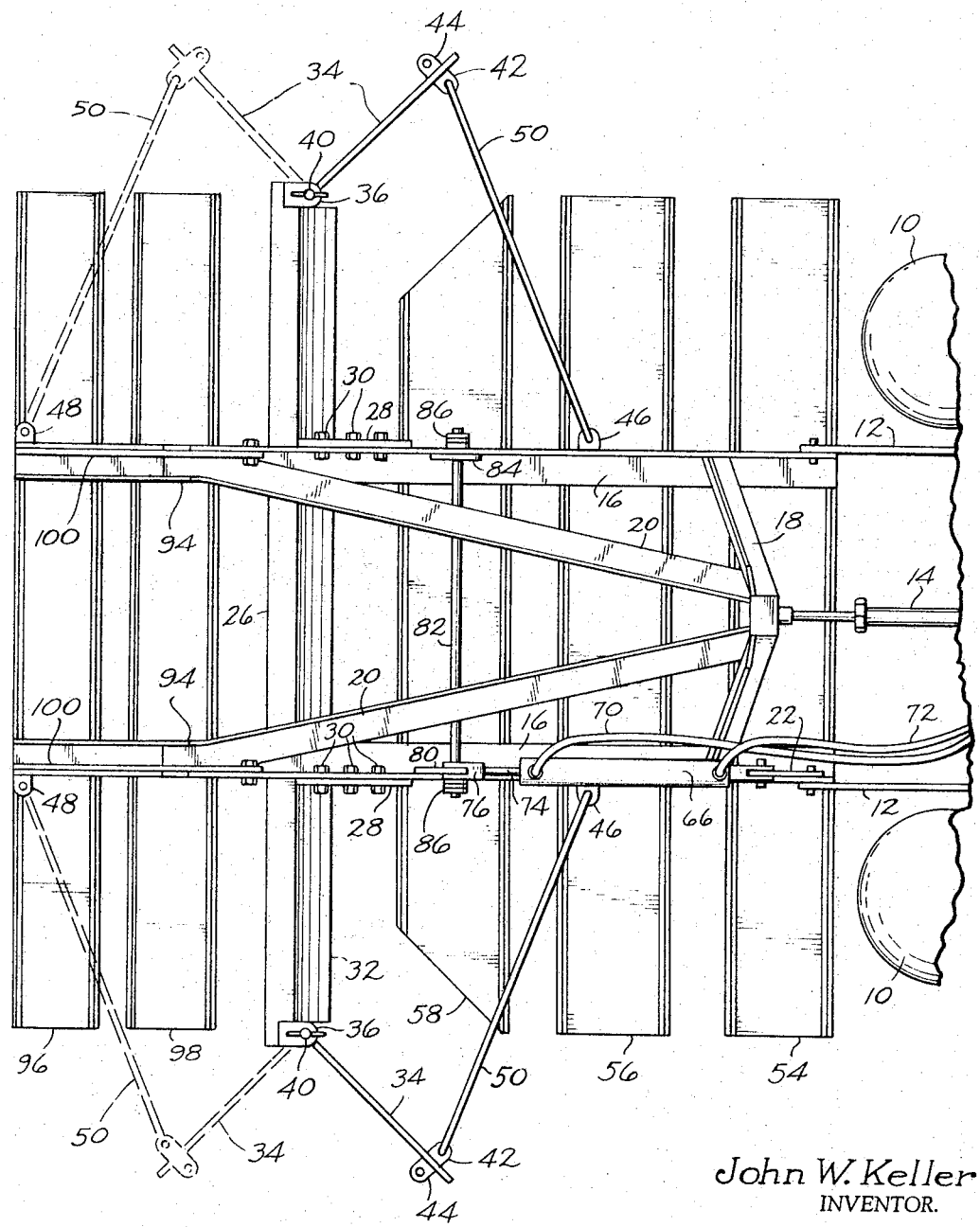
FIG. 1 is a plan view of the herein described ground surfacing apparatus, attached to a tractor.

As viewed in the drawings, the ground surfacing apparatus of my invention is attached to a tractor 10 fitted with the usual lift bars 12 and turnbuckle 14 by means of which the entire apparatus may be lifted and transported, or lowered and used.

The frame of the apparatus includes a pair of spaced, horizontal, longitudinally arranged frame members 16, a vertical forwardly inclining extension standard 18 and a pair of angularly arranged braces 20.

A vertical support plate 22 is fixed intermediate its ends to the forward end of one of frame members 16. An angular brace 24 extends between the lower end of support plate 22 and the frame member 16 to which it is attached.

The frame composed of the foregoing members supports three ground-working units, i.e. a scraper blade unit, a forward drag unit, and a rearward drag unit. All of these units are removable from the frame, independently of each other. Furthermore, each of the units may be employed with or without the other units, or in any combination with the other units to render the apparatus versatile in its function and application.

The scraper blade unit is mounted upon a heavy channel iron 26, or other suitable support, bolted transversely to frame members 16 at an intermediate point toward the rear of the apparatus. A pair of gusset plates 28 are welded to the forward face of channel 26. These are bolted by bolts 30 to frame members 16, stiffening the unit.

A scraper blade 32 is welded to the front lower face of channel 26, as well as to gusset plates 28. A scraper unit thus is provided which may be mounted in the illustrated operative position, or removed entirely by unbolting the bolts connecting channel 26 and plates 28 to frame members 16.

Blade extensions 34 are provided, one for each end of blade 32. These serve the functions of extending the blade into corners otherwise inaccessible, and also of smoothing the ground on each side of the blade to eliminate the side streaks of dirt which usually are formed by the operation of apparatus of this class.

Blade extensions 34 are secured removably and adjustably by hinging their inner edges to channel 26.

To this end there are provided between channel 26 and the outer surface of each of gusset plates 28 a plurality of vertically spaced, perforated ears 36. The inner side edge of each of blade extensions 34 is provided with a plurality of vertically spaced pipe sections 38. These form the knuckles of a hinge which is completed by a hinge pin 40 insertable through all of ears 36 and pipe sections 38 in the manner illustrated in FIG. 2.

The manner of adjustment of blade extensions 34 between forwardly angled positions in which they reach inaccessible corners and rearwardly angled positions wherein they smooth side streaks left by scraper blade 32, is evident in FIG. 1.

Each of blade extensions 34 has on its upper outer margins, a forwardly extending, perforated tab 42 and a rearwardly extending, perforated tab 44. Similarly, each of frame members 16 bears on its outer side surface a cooperating forwardly located perforated tab 46. A cooperating rearwardly located perforated tab 48 is mounted on the frame of a rearward drag unit, to be described in detail hereinafter.

A connecting rod 50 is dimensioned to interconnect the perforated tabs above described. When used to interconnect tab 46 and tab 42, blade extension 34 will be releasably anchored in its forwardly extending full line position of FIG. 1. In this position it may be used to extend into corners and areas not easily reached by main blade 32, as well as to smooth over side streaks left by the operation of main scraper blade 32.

However, when connecting rod 50 interconnects tabs 44 and 48, there results an adjustment of blade extensions 34 to the dotted line position of FIG. 1. In this position it is angled rearwardly and serves the function of filling holes alongside the apparatus.

The forward, ground-leveling, drag unit mounted on the frame of the apparatus includes a pair of spaced, longitudinally placed channel irons 52 positioned parallel to and inside of main frame members 16. Welded across the underside of channel members 52 are a plurality of spaced, parallel, transverse drag members 54, 56, 58. These also may comprise channel irons, arranged with their flat sides down and having their leading edges elevated with respect to their trailing edges. As shown particularly in FIG. 1 the back corners of drag members 58 are cut away so that dirt will not pile up when wing extensions 34 are employed in their forwardly angled position.

The forward drag unit is so mounted on the main frame that it may be shifted between operative and inoperative positions, or even removed altogether if desired.

To this end there is provided on the forward end of each of channel members 52 a bearing 60 which registers with an opening 62 through the lower ends of support plate 22 and brace 24 so that a pivotal connection may be achieved by insertion of a pivot pin 64.

Figure 2:
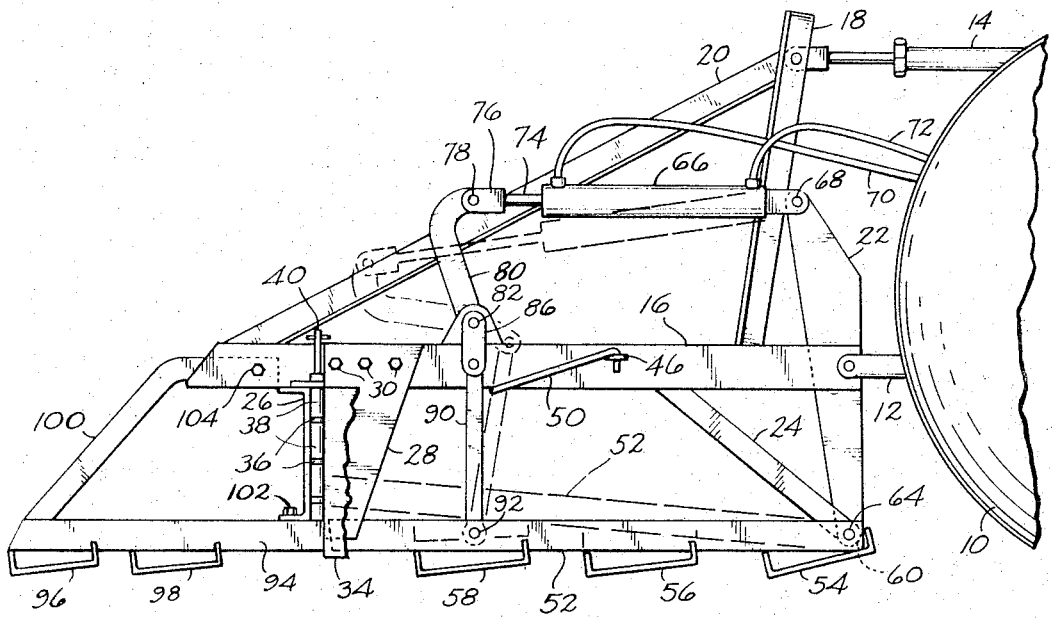
FIG. 2 is a view in side elevation of the apparatus of FIG. 1.

The rearward end of the forward drag unit then may be shifted between the full line operative position and dotted line inoperative position of FIG. 2 by a drive illustrated particularly in that figure.

The base of a fluid operated cylinder 66 is pivotally connected to the top of support plate 22 by means of a pin 68. The cylinder is double acting and is supplied with hydraulic fluid, or air under pressure, through lines 70, 72.

The piston rod 74 of the cylinder terminates in a clevis 76 which is pivotally connected by a pin 78 to one end of a crank arm 80.

The other end of crank arm 80 is rigid to a rock shaft 82 supported on standards 84, extending upwardly from frame members 16.

Also rigid to rock shaft 82 are a pair of connecting links 86, one on each end of the rock shaft. The outer ends of links 86 are pivotally connected through pins 88 to the upper ends of lift arms 90. The lower ends on the lift arms are pivotally connected by means of pins 92 to the rearward ends of channels 52 which mount drag members 54, 56, 58.

As shown in FIG. 2, operation of cylinder 66 shifts the forward drag unit between elevated and lowered position, the unit swinging about pins 64. If it is desired to remove the drag unit altogether, this may be accomplished simply by removing pins 64 and 92. Lift arms 90 then may be swung back upwardly and rearwardly through an angle of 180° or more to an out of the way position.

The construction of the rearward ground leveling drag unit is shown particularly in FIGS. 1 and 2.

This unit is supported on a pair of spaced, longitudinally extending, frame members 94 to the undersides of which are welded a plurality of spaced, transverse drag members 96, 98. These correspond in structure to drag members 54, 56, 58, previously described. They conveniently may comprise channel irons arranged with their flat faces downward, and upwardly inclined in the direction of travel of the apparatus. Braces 100 extend upwardly and forwardly from the rear end of each of frame members 94.

The rearward drag unit removably is attached to the main frame, behind blade 32, by bolting the forward ends of frame members 94 to the underside of transverse channel iron 26, using bolts 102, and by bolting the forward end of braces 100 to main frame members 16, using bolts 104. The entire rearward drag unit assembly thus may be removed simply by removing bolts 102, 104 when its removal is desired.

OPERATION

The operation of the ground surfacing apparatus of my invention is as follows:

The apparatus is connected to lift bats 12 and turnbuckle 14 of the tractor in the illustrated manner. These tractor members make possible lifting the entire surfacing apparatus so that it may be transported from place to place, and lowering it into operative position when the site to be leveled has been reached.

If a scraping operation is involved, cylinder 66 is extended, raising the forward ground leveling unit to its inoperative, dotted line position of FIG. 2. This exposes scraper blade 32.

If it is desired to reach into corners that are difficult of access, or to obliterate the side streaks usually formed by operation of a scraper blade, blade extensions 34 may be adjusted to the forwardly angled position of FIG. 1. If it is desired to fill holes alongside the apparatus, blade extensions 34 may be shifted to the rearwardly angled, dotted line position of the same figure. These adjustments are accomplished merely by relocating the positions of connecting rods 50 in the manner indicated.

On the other hand, if the operation contemplated is primarily a dragging operation, the forward ground leveling drag unit may be placed in the operative, full line position of FIG. 2 by retracting cylinder 66. This converts the apparatus to an effective drag, including both the forward and rearward drag units.

If desired, either or both of the drag units may be removed entirely from the frame. The forward drag unit is removed by taking out pins 64, 92, as shown in FIG. 3.

Figure 3:
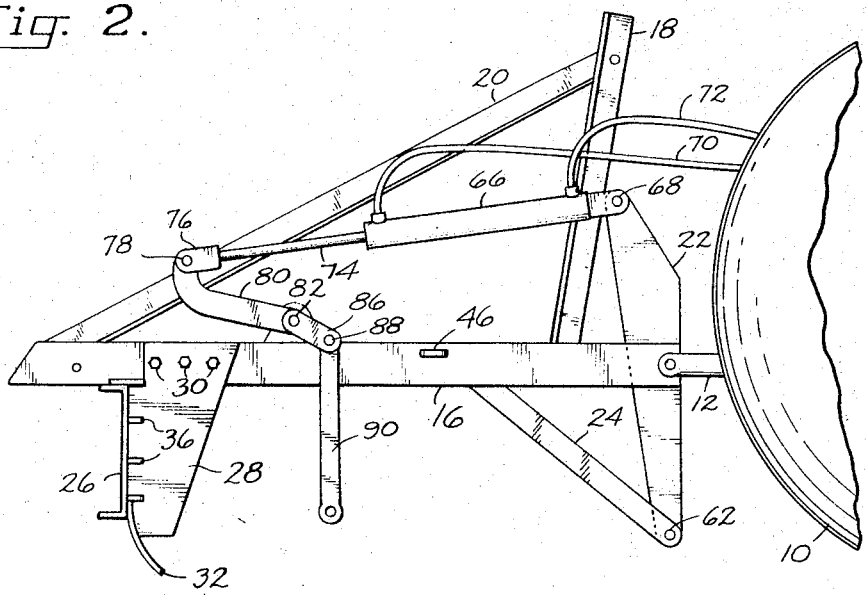
FIG. 3 is a view in side elevation of the frame and blade unit only of the apparatus of FIGS. 2 and 3.

The rearward drag unit is removed easily by removing bolts 102, 104, as shown also in FIG. 3. This leaves the scraper blade unit as the sole functioning unit of the assembly. The drag units then may be remounted on the frame, singly or together.

There thus is provided a simple apparatus which is readily attachable to a conventional tractor and which is versatile in its operation in that it may be caused to perform its scraping, dragging, smoothing and packing functions independently or cooperatively upon making easily effectuated adjustments.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. Ground surfacing apparatus comprising
   (a) a frame
   (b) coupling means on the frame for coupling the same to a vehicle
   (c) ground-scraping blade means mounted centrally on the frame, transversally thereof
   (d) forward ground-leveling drag means
   (e) mounting means for mounting the forward drag means on the frame, forwardly of the blade means, the mounting means comprising pivot means pivoting the forward end of the drag means to the frame, motor means, and connecting means connecting the rearward end of the drag means to the motor means for adjusting the drag means between elevated inoperative and lowered working positions (f) rearward ground-leveling drag means and (g) attaching means for attaching the rearward drag means to the frame rearwardly of the blade means.

2. The ground surfacing apparatus of claim 1 wherein the vehicle comprises a tractor equipped with draw and lift bars and wherein the coupling means comprise means for coupling the frame to the same.

3. The ground surfacing apparatus of claim 1 wherein the forward drag means comprise a pair of spaced bars arranged longitudinally with respect to the frame and, fixed to the underside of the bars, a plurality of transversely arranged, elongated drag members having their undersurfaces substantially flat and having their leading edges elevated with respect to the trailing edges thereof.

4. The ground surfacing apparatus of claim 1 wherein the motor means comprises a fluid operated cylinder mounted on the frame, a crank arm having one end pivotally connected to the cylinder, a rock shaft rigidly connected to the other end of the crank arm, a connecting link having one end rigid to the rock shaft, and a lift arm one end of which is pivoted to the connecting link and the other to the rearward end of the drag means.

5. The ground surfacing apparatus of claim 1 wherein the rearward drag means comprises a pair of spaced bars arranged longitudinally of the frame and, mounted on the underside of the bars, a plurality of spaced, transversely arranged, elongated drag members having flat undersurfaces upwardly inclined in the direction of travel of the apparatus.

6. The ground surfacing apparatus of claim 1 wherein the attaching means comprise releasable attaching means permitting removal of the rearward drag means from the frame.

7. The ground surfacing apparatus of claim 1 including a pair of blade extensions, hinge means for hinging the blade extensions one to each end of the blade means, and positioning means interconnecting the extensions and the frame for positioning the extensions in a selected angular relationship to the blade means between forwardly and rearwardly extended limits.

8. The apparatus of claim 7 wherein the positioning means for each blade extension comprises rod means and a pair of perforated tabs, one tab of each pair being mounted on the frame and one on the blade extension, the rod means being insertable in the perforations of the tabs to maintain the blade extension with which it is associated in the predetermined angular relationship to the blade means.

References Cited

UNITED STATES PATENTS

| | | | |
|---|---|---|---|
| Re. 23,190 | 1/1950 | Smith | 37—153 |
| 1,173,016 | 2/1916 | Monroe et al. | 37—153 |
| 1,466,464 | 8/1923 | Beatty | 37—143 |
| 1,945,517 | 2/1934 | Carlson | 37—143 |
| 2,581,672 | 1/1952 | Keim. | |
| 3,113,391 | 12/1963 | Long | 37—176 |
| 3,122,209 | 2/1964 | Crites | 37—175 X |

ABRAHAM G. STONE, *Primary Examiner.*

R. L. HOLLISTER, *Assistant Examiner.*